US010684888B1

(12) United States Patent
Sethuramalingam et al.

(10) Patent No.: US 10,684,888 B1
(45) Date of Patent: Jun. 16, 2020

(54) SELF-ORGANIZING SERVER MIGRATION TO SERVICE PROVIDER SYSTEMS

(71) Applicant: Amazon Technologies, Inc., Seattle, WA (US)

(72) Inventors: Ekanth Sethuramalingam, Milpitas, CA (US); Nagaraju Shiramshetti, Santa Clara, CA (US); Vivek Chawda, Albany, CA (US); Vivek Menon, San Jose, CA (US); Sumeet Talwar, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 111 days.

(21) Appl. No.: 15/790,437

(22) Filed: Oct. 23, 2017

(51) Int. Cl.
| | |
|---|---|
| *G06F 9/48* | (2006.01) |
| *H04L 12/26* | (2006.01) |
| *H04L 12/24* | (2006.01) |
| *G06F 9/455* | (2018.01) |
| *G06F 11/20* | (2006.01) |
| *G06F 9/50* | (2006.01) |

(52) U.S. Cl.
CPC ........ *G06F 9/4875* (2013.01); *G06F 9/45558* (2013.01); *G06F 11/203* (2013.01); *H04L 41/0879* (2013.01); *H04L 43/045* (2013.01); *G06F 9/5088* (2013.01); *G06F 2009/4557* (2013.01); *H04L 41/22* (2013.01)

(58) Field of Classification Search
CPC ........... G06F 9/5077; G06F 2009/4557; G06F 9/4856; G06F 9/504
See application file for complete search history.

(56) References Cited

U.S. PATENT DOCUMENTS

| 8,296,434 | B1 * | 10/2012 | Miller ................. H04L 67/1029 709/226 |
| 8,667,490 | B1 * | 3/2014 | van der Goot ..... G06F 9/45558 711/162 |
| 9,098,214 | B1 * | 8/2015 | Vincent ................. G06F 9/4856 |
| 9,246,840 | B2 * | 1/2016 | Anderson ............. G06F 9/5077 |
| 2003/0074386 | A1 * | 4/2003 | Schmidt ............... G06F 9/4451 718/1 |

(Continued)

OTHER PUBLICATIONS

Ahmad et al ;"A survey on virtual machine migration and server consolidation frameworks for cloud data centers";"15 pages" (Year: 2015).*

*Primary Examiner* — Wei Y Zhen
*Assistant Examiner* — Brahim Bourzik
(74) *Attorney, Agent, or Firm* — Nicholson De Vos Webster & Elliott

(57) ABSTRACT

Techniques for self-organizing server migration into service provider systems are described. Connectors can be deployed in a customer network and associated with one or more virtual machine (VM) management servers and also with a server migration service. The customer may indicate what VMs are to be migrated, and the server migration service can dynamically select one or more of the connectors to perform migration operations based on operational or configuration characteristics of the connectors and/or the type of migration job to be performed. The connectors can be auto-scaled to increase or decrease operational capacity, and graceful failovers can be performed to eliminate migration failures resulting from connector failures.

20 Claims, 9 Drawing Sheets

(56) References Cited

U.S. PATENT DOCUMENTS

| | | | | |
|---|---|---|---|---|
| 2012/0192181 A1* | 7/2012 | Gilbert | G06F 9/45558 | 718/1 |
| 2013/0073731 A1* | 3/2013 | Bose | G06F 9/5088 | 709/226 |
| 2013/0212578 A1* | 8/2013 | Garg | H04L 43/0882 | 718/1 |
| 2014/0156958 A1* | 6/2014 | Dow | G06F 3/0647 | 711/162 |
| 2014/0359114 A1* | 12/2014 | Takamure | G06F 9/45558 | 709/224 |
| 2015/0039764 A1* | 2/2015 | Beloglazov | H04L 47/70 | 709/226 |
| 2015/0052523 A1* | 2/2015 | Raghu | G06F 9/45533 | 718/1 |
| 2015/0193246 A1* | 7/2015 | Luft | G06F 9/5072 | 718/1 |
| 2016/0070601 A1* | 3/2016 | Yamamoto | G06F 9/5088 | 718/105 |
| 2016/0188353 A1* | 6/2016 | Shu | G06F 9/45533 | 718/1 |
| 2016/0378525 A1* | 12/2016 | Bjorkengren | G06F 9/45558 | 718/1 |
| 2017/0373935 A1* | 12/2017 | Subramanian | H04L 41/0816 | |

* cited by examiner

SELF-ORGANIZING SERVER MIGRATION TO SERVICE PROVIDER SYSTEMS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
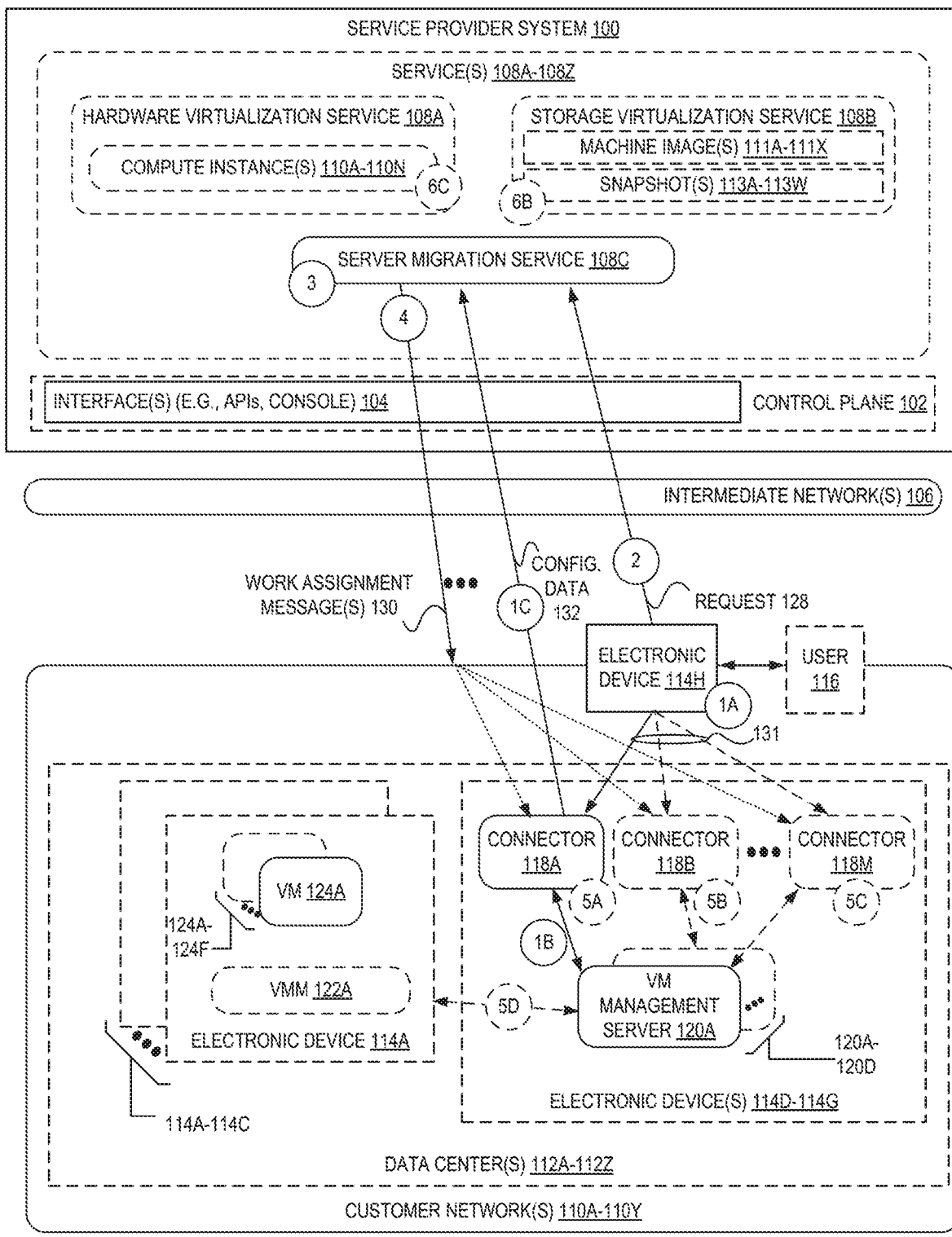
FIG. 1 is a diagram illustrating an environment for self-organizing server migration to service provider systems according to some embodiments.

Various embodiments of methods, apparatus, systems, and non-transitory computer-readable storage media for self-organizing server migration to service provider systems are described. According to some embodiments, customers seeking to migrate one or more servers—e.g., virtual machines (VMs)—to a service provider system may launch "connectors" within their customer network that can work under the direction of a server migration service to intelligently perform the server migration. In some embodiments, the server migration is performed by one or multiple connectors that are selected, based on one or more of a variety of factors, as those that are the most well-suited to perform the migration, without the customer needing to perform the selection. The server migration service can, in some embodiments, gracefully accommodate connector failures or performance issues by selecting other connectors to perform server migration operations without needing to involve the customer. In some embodiments, the server migration service can automatically scale—i.e., increase or decrease—the operational capacity for server migration by causing additional connectors to be created (and utilized) or extraneous connectors to be eliminated. The addition of connectors via automatic scaling can occur, for example, in response to an immediate need for additional operational capacity or prospectively to accommodate an anticipated need for capacity.

In recent years, organizations have begun to realize the benefits of moving their computing resources—e.g., applications, servers, data—out of their existing enterprise data centers, which tend to be expensive to maintain and have scalability or resiliency issues. In particular, entities have turned to service provider systems (also commonly referred to as "cloud computing providers") for information technology services such as Software-as-a-Service (SaaS), Platform-as-a-Service (Paas), Infrasturcture-as-a-Service (Iaas), etc.

Moving computing resources out of an enterprise (or private) network into a service provider's network, however, can be enormously difficult. For example, some organizations may utilize tens, hundreds, or even more servers (e.g., VMs, physical server devices) having a variety of types, configurations, and interdependencies. These servers may also be executed in a variety of geographic locations and/or data centers. Moreover, typically some or all of these servers must remain in use throughout the migration or perhaps only tolerate a bare minimum of downtime until being switched over to the new environment. Furthermore, it is also common that the state of these resources—such as ongoing transactions or customer data—may change during the migration, and this state also must be gracefully migrated to prevent disruptions of service or inconsistencies.

Accordingly, embodiments disclosed herein provide self-organizing server migration to service provider systems that can relieve the often substantial burdens currently placed on organizations seeking to migrate their servers. In some embodiments, a customer can deploy one or more connectors—e.g., applications or VMs—within their network, which can communicate with a server migration service of a service provider system. Upon the customer configuring the connectors with credentials necessary to communicate with one or more VM manager servers (e.g., vCenter Server™ by VMWare®, System Center Virtual Machine Manager (SCVMM) by Microsoft®) in the customer network and with the service provider system, in some embodiments, the customer may identify which servers are desired to be migrated, and the server migration service can intelligently and automatically assign migration operations (or "distribute work") to ones of the connectors that are the most well-suited to perform these operations. In some embodiments, the server migration service can re-assign migration operations to another connector or connectors upon a "working" connector crashing or suffering from performance issues. Further, in some embodiments the server migration service can automatically scale-up migration processing by intelligently causing additional connectors to be launched to provide additional operational capacity when it is needed or will likely be needed in an upcoming amount of time. Likewise, in some embodiments, the server migration service can intelligently cause connectors to be destroyed when they are no longer needed and/or will not likely be needed in an upcoming amount of time.

FIG. 1 is a diagram illustrating an environment including a server migration service 108C for self-organizing server migration to service provider systems according to some embodiments. The server migration service 108C may operate as part of a service provider system 100, and may comprise one or more software modules executed by one or more electronic devices at one or more data centers and/or geographic locations.

A service provider system 100 provides users with the ability to utilize one or more of a variety of types of resources such as computing resources (e.g., executing virtual machine (VM) instances and/or containers, executing batch jobs, executing code without provisioning servers), data/storage resources (e.g., object storage, block-level storage, data archival storage), networking resources (e.g., configuring virtual networks including groups of compute resources, content delivery networks (CDNs), Domain Name Service (DNS)), application resources (e.g., databases, application build/deployment services), etc. These and other resources are provided as services 108A-108Z, such as a hardware virtualization service 108A that can execute compute instances 110A-110N, a storage virtualization service 108B that can store data objects, etc. The users (or "customers") of service provider systems 100 may utilize one or more user accounts that are associated with a customer account, though these terms may be used somewhat interchangeably depend ending upon context of use. Users may interact with a service provider system 100 across one or more intermediate networks 106 (e.g., the internet) via one or more interfaces 104, such as through use of application programming interface (API) calls, via a console implemented via a website, etc. These interfaces 104 may be part of, or serve as a front-end to, a control plane 102 of the service provider system 100 that includes "backend" services supporting and enabling the services 108A-108Z that may be more directly offered to customers.

To provide these and other computing resource services, service provider systems 100 often rely upon virtualization techniques. For example, virtualization technologies may be used to provide users the ability to control or utilize compute instances 110A-110N (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the service provider system to perform a variety of computing tasks, or may indirectly utilize a compute instance by submitting code to be executed by the service provider system, which in turn utilizes a compute instance to execute the code (typically without the user having any control of or knowledge of the underlying compute instance(s) involved).

As indicated above, it has become desirable to move servers (e.g., one or more of VMs 124A-124F) out of customer networks 110A-110Y and into a service provider system 100 (e.g., to be run as one or more compute instances 110A-110N) for any number of benefits, including increased scalability and/or stability provided by service provider systems 100, reduced management and infrastructure intertreatment costs, etc. Embodiments provide simple yet powerful server migration via a server migration service 108C.

For example, FIG. 1 shows one or more customer networks 110A-110Y with one or more servers (e.g., VMs 124A-124F) executed by one or more electronic devices 114A-114C located within one or more data centers 112A-112Z. VMs 124A-124F are often implemented along with a virtual machine monitor (VMM) 122A that provides an execution environment for the VMs on the host electronic device. In many environments, VMs 124A-124F can be independently and/or collectively managed using one or more VM management servers 120A-120D. For example, a VM management server 120A may be configured to manage a group of VMs, such as some or all VMs executed within a data center, e.g., tens, hundreds, thousands, or tens of thousands of VMs executed by up to potentially hundreds of electronic devices. VM management servers 120A provide a centralized system for managing the lifecycle of its managed VMs, such as via starting VMs, stopping VMs, creating complete or incremental snapshots (or backups) of VMs, restoring VMs, modifying permissions, functionalities, or configurations of VMs, etc.

To perform a migration, in some embodiments, the customer can deploy and configure one or more connectors 118A-118M in the customer network(s) 110A-110Y as shown at circle '1A' of FIG. 1. A connector, in some embodiments, can be a software application (e.g., a special-purpose virtual machine, a standalone application) that "connects" the server migration service 108C with the VMs 124A-124F via one or more VM management servers 120A-120D, allowing the server migration service 108C to indirectly operate upon the VMs 124A-124F for performing a migration. As one example, a connector could be a FreeBSD VM in Open Virtualization Format (OVA) that can be downloaded from the service provider system 100. To deploy the one or more connectors 118A-118M, the customer can install or execute the connector on an electronic device (e.g., a server device), launch the connector as a VM, etc., that has connectivity within a customer network 110A to reach one or more VM management servers 120A-120D and the (remote) server migration service 108C, etc.

Alternatively, the connector can also be an electronic device that is placed in the customer network(s) 110A-110Y and is granted communicative connectivity (e.g., network connectivity) to communicate with a VM management server 120A and the server migration service 108C.

Upon deploying the one or more connectors 118A-118M, the customer can configure each connector with credentials for accessing the a VM management server 120A and/or the service provider system 100. For example, a user 116 may be provided an interface such as a command-line interface (CLI), web-based console, etc., that provides the user the ability to configure the connector via issuing commands/requests 131. For example, in some embodiments the user 116 may access a web portal in a web browser or application via an Internet Protocol (IP) address utilized by or assigned to the connector, and send HyperText Transport Protocol (HTTP) requests to each connector.

In some embodiments, the user 116 configures each connector with credentials (e.g., one or more of an access key, secret key, username, password, etc.) for accessing the service provider system 100. The user 116 may create/obtain these credentials from the service provider system 100 (e.g., by configuring a new user account) via an interface 104 and provide them to the connector via the connector's interface. In some embodiments, the connector is "hard-coded" with a domain name or IP address of the service provider system 100 that it can use to connect to the service provider system 100, though in some embodiments the user 116 may provide a resource identifier (e.g., an IP address, a domain name, a Uniform Resource Locator (URL) or Uniform Resource Identifier (URI)) to each connector.

In some embodiments, the user 116 configures each connector with data including credentials (e.g., one or more of an access key, secret key, username, password, etc.) and/or a resource identifier (e.g., a hostname, an IP address) of one or more VM management servers 120A-120D that the connector is to be associated with. In some embodiments, each connector is associated with exactly one VM management server (which is assumed for the rest of this description), though in other embodiments a connector may be associated with multiple VM management servers.

Upon the configuration, at circle '1B', each connector 118A communicates with its associated VM management server 120A and obtains configuration data 132 that, at circle '1C', is provided to the server migration service 108C. For example, in some embodiments the connector 118A retrieves a server list (e.g., one or more of a VM name, network address, description, type, capacity, configuration, etc.) that identifies one or more of the VMs 124A-124F that are managed by that VM management server 120A. The connector 118A may then provide this server list within the configuration data 132 at circle '1C' to the server migration service 108C, which may cache or persist this configuration data 132. In some embodiments, the operations represented at circles '1B' and '1C' may be performed periodically (or upon a request from the server migration service 108C) to ensure that the server list at the server migration service 108C is kept up-to-date as the VMs 124A-124F change (e.g., the number of VMs, the configurations or characteristics of the VMs). Additionally, in some embodiments, a connector 118A may first communicate with the server migration service 108C (e.g., to validate that it has been provided proper credentials, permissions, etc.), and then communicate with the VM management server 120A, etc.

In some embodiments, as part of the configuration data 132 or as part of separate data (perhaps sent via a different message), each of the connectors 118A-118M may send metric data corresponding to the connector. The transmission of this metric data by the connectors may occur periodically (e.g., according to a schedule) or upon an explicit request for the data from the server migration service 108C. The metric data may include current performance characteristics of the connector and/or resource availabilities of the connector. By way of example, the metric data could include one or more of a processing utilization of the connector (e.g., a recent utilization of one or more CPUs available to the connector) or processing availability of the connector (e.g., a number and/or type of CPUs available to the connector); network latency information between the connector and its corresponding VM management server(s) and/or VMs 124A-124F; an amount of memory (e.g., random access memory (RAM), cache) available to or utilized by the connector; an amount of non-volatile storage (e.g., hard disk space, solid-state drive (SSD) space) available to or utilized by the connector; an amount of bandwidth available to or utilized by the connector; etc. This metric data, in some embodiments, is cached or persisted by the server migration service 108C.

At circle '2', the customer (e.g., user 116 via electronic device 114H) can issue a request 128 to the server migration service 108C to perform a migration of one or more of the VMs 124A-124F. For example, the user 116 may utilize an interface 104 (e.g., a console) to acquire a list of VMs 124A-124F that have been associated or "registered" (e.g., via configuration data 132 from one or more connectors 118A-118M authorized under the customer's account) with the server migration service 108C. The user 116 may then, for example, simply select one or more of these VMs 124A-124F that are desired to be migrated, and cause the electronic device 114H to issue a request 128 (e.g., an API call, a HyperText Markup Language (HTML) form submission, etc.) identifying which of the VMs 124A-124F are to be migrated.

In response to receipt of the request 128, at circle '3', the server migration service 108C can select ones of the one or more connectors 118A-118M that are most capable of performing certain operations for the migration according to a selection scheme. This selection can occur, for example, using metric data provided by the one or more connectors 118A-118M, to allow for intelligent automated connector-selection, without requiring that the user 116 indicate which connectors are to perform which operations. Further detail regarding the intelligent selection of connectors for performing migration operations will be presented later with regard to FIG. 2.

Upon selecting one or more connectors to perform migration operations, the server migration service 108C can send one or more work assignment messages 130. The sending of a work assignment message 130 may utilize, for example, a polling mechanism wherein each of the connectors 118A-118M periodically checks with the service provider system 100 (e.g., via a RESTful API call to an API endpoint—e.g., interface 104) to determine whether there are new work assignment tasks for the connector, and in response, the service provider system 100 can send the work assignment message(s) 130. However, in other embodiments, "push" messaging techniques such as Webpush, HTTP server push, long polling, etc., can be utilized to notify the selected connector(s) of the work assignment message 130. The work assignment message 130, in some embodiments, identifies one or more operations that the recipient connector is to perform, and optionally an identifier of a VM that the connector is to perform the operation upon.

Each recipient connector may the begin performing the assigned operations (at one or more of circles '5A' and '5B' and '5C'), which could include sending commands to its associated VM management server (e.g., to cause the VM management server to perform certain operations with the VMs sought to be migrated, such as by issuing commands to one or more VMMs 122A or VMs 124A-124F at circle '5D') or potentially directly with the VM(s). A variety of different types of operations may be performed by a connector to perform a migration, including but not limited to validating a replication job, creating a base (or "full") snapshot, creating a delta (e.g., an "incremental") snapshot, creating a storage location (or "bucket") within the service provider system 100 (e.g., via a storage virtualization service 108B), uploading a base snapshot, uploading a delta snapshot, deleting artifacts that have already been uploaded (e.g., a snapshot), consolidating a snapshot, etc.

For example, in some embodiments a connector may perform a migration for a VM by creating a full snapshot of the VM, creating a data storage object (e.g., a "bucket" or "folder") in a storage virtualization service 108B, transmitting the snapshot to the be stored in the data storage object (e.g., as snapshots 113A-113W), etc. The server migration service 108C may use utilities to create, from the snapshots 113A-113W, disk volumes and associated machine images 111A-111X that can be launched as compute instances 110A-110N in the hardware virtualization service 108A.

Figure 2:
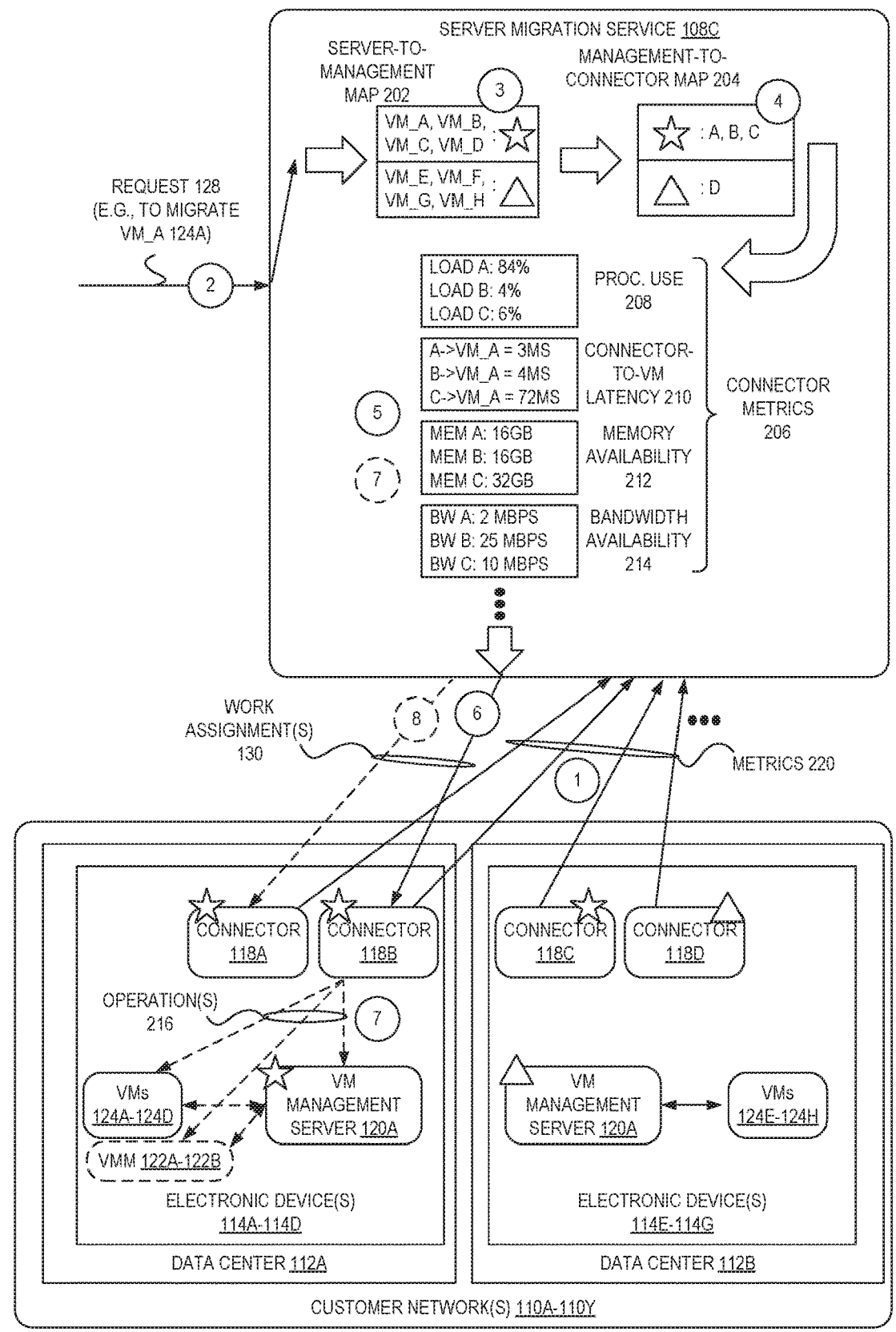
FIG. 2 is a diagram illustrating selection scheme operations using connector metric values for selecting connectors for server migration to service provider systems according to some embodiments.

For additional detail involving the connector selection process, we turn to FIG. 2, which is a diagram illustrating selection scheme operations using connector metric values for selecting connectors to be used for server migration to service provider systems according to some embodiments. In this example environment, the "star" icon is used to show the three connectors (located at two data centers 112A-112B) that are associated (or registered/paired) with a first VM management server 120A that manages VMs 124A-124D, and a "triangle" icon is used to show one connector (at data center 112B) that is associated with a second VM management server 120A that manages VMs 124E-124H.

In FIG. 2, at circle '1', the connectors 118A-118D send metric values 220 to the server migration service 108C. As indicated above, the metric values 220 may be sent independently from the configuration data 132, or may be part of the configuration data 132. This metric data (i.e., metrics 220) can be processed by the server migration service 108C and cached/stored as connector metrics 206.

In this example, the connector metrics 206 include metric values for processor utilization 208, metric values for connector-to-VM latency 210 (indicating a latency between a connector and a particular VM), metric values for memory availability 212, and metric values for bandwidth availability 214, though other and/or different metric values can be used.

As shown by circle '2', upon receipt of a request 128 to migrate a VM 'A' (e.g., VM 124A), the selection scheme can include, at circle '3', identifying which VM management server manages the requested VM 'A' 124A. In this illustrated example, a server-to-management map 202 (created using reported server list data from configuration data 132) can be queried (or indexed) using an identifier of the requested VM 'A' 124A to determine an identifier of a VM management server—here, represented as a star.

At circle '4', the selection scheme can include using the identified VM management server (here, the star) to identify a group of connectors that are able to perform operations for migration involving that VM management server. In this illustrated example, this identification includes querying (or indexing) a management-to-connector map 204 (created using configuration data 132), to result in a group of three connectors—'A' and 'B' and 'C' being identified as eligible.

From the group of three eligible connectors, at circle '5' the server migration service 108C can select one or more of the group to be used to perform migration operations. The selection scheme can be simple or complex, and may involve use of the connector metrics 206 and/or an analysis of the number or type of operations needed to perform the migration.

As one example, the selection scheme could include identifying what amount and/or types of the connectors should perform the migration operations. For example, if one VM is to be migrated, it may be the case that only one connector would be used, though it could also be the case that some operations for the migration could be performed (e.g., perhaps in parallel) by multiple connectors. Thus, the selection scheme could rely upon an identification of how many operations are required, whether any of the operations can be performed in parallel, how complex (or resource intensive) the operations are, what permissions are required (by a connector) in order to perform the operations, etc., and select between the available connectors to determine which one or more connectors can optimally perform the migration.

In some embodiments the selection scheme includes identifying which connectors of the group have certain metrics 206 that individually or in combination satisfy a condition (e.g., have or provide a maximum or minimum value). For example, one selection scheme could rely on one connector metric 206—e.g., the connector-to-VM latency 210 values—and could include identifying which of the group of connectors have the lowest latency to the requested-to-be-migrated VM 'A' 124A. This scheme could be used, for example, when the operations to be performed for a migration involve transmitting and receiving significant numbers of different messages between the connector and the VM. In this case, if one connector is desired to perform the operations, the selection scheme may thus select connector 'A' 118A, as it has a smallest connector-to-VM latency value to VM 'A' 124A of 3 milliseconds (ms). Alternatively, if two connectors are desired to perform the operations, the selection scheme may select connector 'A' 118A and connector 'B' 118B, as these have the two smallest connector-to-VM latency values to VM 'A' 124A (of 3 ms and 4 ms, respectively).

In some embodiments, a selection scheme can rely on two or more connector metrics 206. For example, a selection scheme could include selecting those of the group of connectors that have at least 5 Mbps of bandwidth availability 214 (and thus satisfy a minimum metric criteria) and that also have the lowest processing utilization 208. In this case, the sub-group to be selected from (i.e., those connectors of the group that satisfy the minimum metric criteria) would include connectors 'B' 118B and 'C' 118C, and if one connector is desired, then connector 'B' may be selected, whereas if two connectors are desired both connectors 'B' 118B and 'C' 118C could be selected. As another example, a selection scheme for a particular migration could include selecting those of the group of connectors that have less than 20% processing utilization 208, less than 100 ms of connector-to-VM latency 210, at least 16 gigabytes (GB) of memory availability 212, and the most bandwidth availability 214.

Further, in some embodiments a migration may include multiple different types of operations, and different selection schemes could be employed to identify different connectors to perform different types of operations. For example, connectors for certain operations (e.g., creating a snapshot of a VM) could be identified using a first selection scheme to identify a connector with a small amount of processing utilization 208 and a large amount of available storage availability (metric not illustrated) and a large amount of memory availability 212, while other connectors for other operations for the migration (e.g., uploading the snapshot from the customer network 110A to the service provider system 100) could be identified using a different selection scheme to identify a connector with a largest bandwidth availability 214.

In some embodiments, the one or multiple selection schemes can be configured by the server migration service 108C, though in some embodiments the user can customize the connector selection, for example, by selecting preferred selection schemes to be used, indicating desired metrics that are to be weighted more heavily, etc.

Accordingly, different characteristics of different connectors from the group of eligible connectors can be relied upon to identify a most optimal connector or connectors for performing migration operations. In the example of FIG. 2, we assume that one connector is needed for the migration, and at circle '6' one or more work assignment messages 130 are sent to a selected connector 118B, causing the connector to perform the indicated operation(s) at circle '7', which can include issuing commands to a VM management server 120A, one or more VMMs 122A-122B, and/or one or more VMs 124A-124D.

In some embodiments, after the work assignment 130 is assigned to a particular set of selected connectors (e.g., connector 118B)—and operations for the migration may have begun—the server migration service 108C can continue monitoring connector metrics 206 at circle '7' to determine whether a different set of connectors could be more optimal (than a current set of connectors) for performing the migration.

For example, a non-utilized connector (e.g., connector 118A) may previously have had "non-optimal" (or comparatively worse) characteristics (e.g., processor utilization, memory availability, latency, etc.) during the initial selection of connectors so that it was not selected to perform migration operations. However, after the initial selection, some event(s) may have occurred—e.g., a non-selected connector finished a different job, a selected connector is suffering from a performance issue, etc.—that may cause non-selected connector(s) to become more optimal than one or more existing connectors performing migration operations. Thus, in some embodiments, the server migration service 108C may effectively re-assign work for the migration via work assignment messages 130 at circle '8' to one or more different connectors (e.g., as illustrated, to include connector 118A), or may cause additional connectors to be launched (as described elsewhere herein, such as with regard to FIG. 3) and then utilize these connectors to perform migration tasks.

A connector can be "removed" from the set of connectors that are performing migration operations in a variety of ways depending upon the particular communication scheme utilized between the connectors 118A-118D and the server migration service 108C. For example, if each connector acquires migration tasks via "pulling" them from a message queue used by the server migration service 108C (which are received by the connector(s) as work assignments 130), the server migration service 108C may stop placing migration task assignments in the work queue for that connector (and/or remove existing migration task assignments in that connector's work queue), and instead place migration tasks in a work queue for any "new" connector or connectors to be utilized. As another example, if the server migration service 108C assigns work by proactively issuing work assignment(s) 130 to connectors, the server migration service 108C could submit a work assignment message to a connector with an empty set of work tasks, or with an instruction to abort performing a particular set of tasks, etc.

In some embodiments, the server migration service 108C can prevent a work assignment "thrashing"—such as when a work assignment is repeatedly switched back and forth between connectors—in one or more of a variety of ways designed to prevent the costs of re-assignments from outweighing the benefits. As one example, the server migration service 108C may be configured to only perform a re-assignment of a task up to a threshold number of times (e.g., 1 time, 2 times), which can "settle" the work assignment at a particular point and prevent re-assignment costs from spiraling.

As another example, the server migration service 108C can use an understanding of the type of migration task being performed (and the associated costs of re-assignment) to determine whether the task can or should be re-assigned. For example, if a task is easily re-assignable—e.g., can easily be "resumed" mid-task by another connector—a re-assignment may be allowed as the cost to do the re-assignment may be low when compared to a potential benefit that could be gained. An example of a re-assignable task could be the transmission/uploading of a flat file, in which the upload is able to be "resumed" and thus the entire file need not be re-uploaded by a new connector. In this case, for example, upon determining that another connector now has superior network bandwidth available, the "cost" of re-assigning the task to the new connector may be significantly outweighed (such as when a large amount of the file remains to be uploaded) by the benefit of using a different connector with superior transmission capacity/speed available. Thus, in some embodiments, the connector initially performing the upload may transmit a work status message to the server migration service 108C indicating how much of the file (e.g., a number of bytes, a particular checkpoint) has been uploaded, and determine whether it is beneficial to re-assign the task, and if so, may instruct a different connector to resume the upload at that point.

In contrast, in some cases the server migration service 108C may be configured to determine when a work task should not or cannot be re-assigned without substantial costs that would outweigh the benefits. For example, if a task is not easily re-assignable—e.g., cannot easily be "resumed" mid-task by another connector—a re-assignment may not be allowed as the overall cost to switch the task may be relatively high. An example of a potentially non-re-assignable task could be the transmission/uploading of certain types of stream-optimized data, in which an upload cannot be easily resumed and instead would need to be restarted from the beginning. Thus, the server migration service 108C may be configured to not re-assign such tasks, or may be able to determine and compare the costs and benefits from leaving the task as assigned versus re-assigning the task. For example, it could be the case that allowing a task to be completed by a first connector with a small available bandwidth would require 30 additional seconds of time (as a stream upload of a large object may be nearly complete—e.g., 95% complete), whereas switching the task to second connector—which may have much larger bandwidth—would require approximately an additional 90 seconds of time due to communication overhead for re-assigning the work and the need for a new connector to begin the upload all over again.

Figure 3:
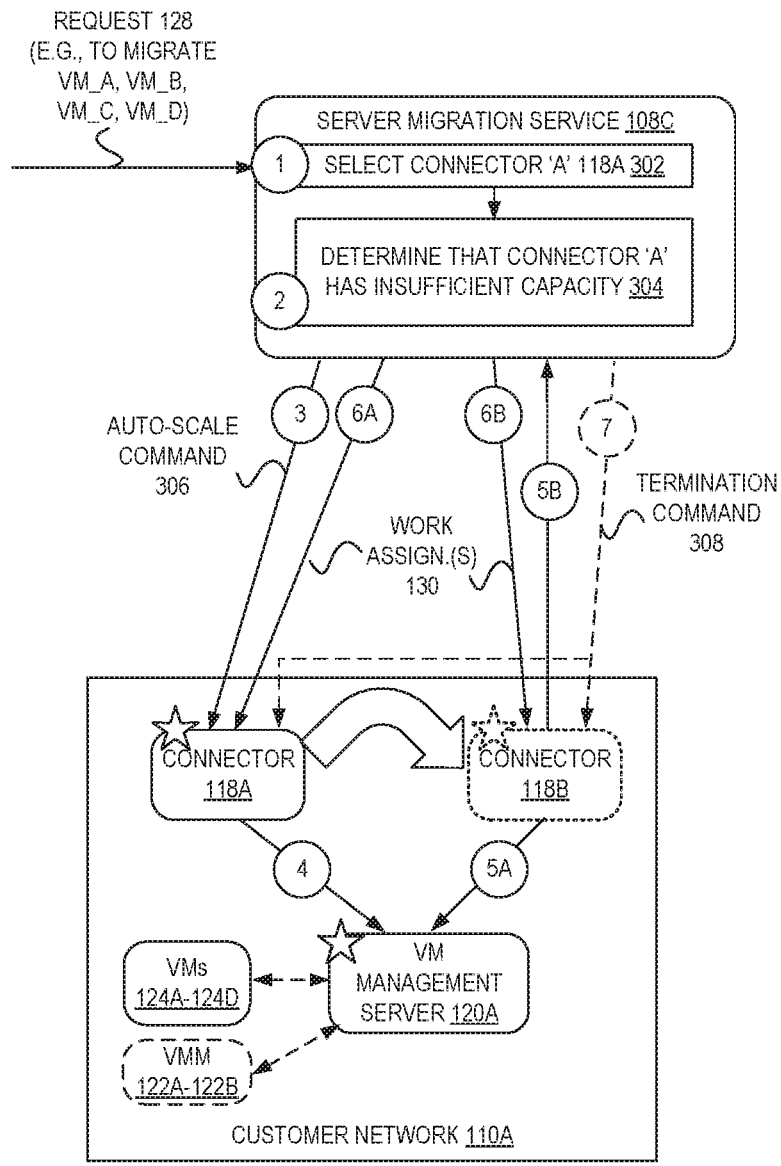
FIG. 3 is a diagram illustrating connector auto-scaling operations for server migration to service provider systems according to some embodiments.

Some embodiments can further improve the migration process via utilizing auto-scaling techniques. FIG. 3 is a diagram illustrating connector auto-scaling operations for server migration to service provider systems according to some embodiments. In some embodiments, the server migration service 108C can cause additional operational capacity in the form of one or more additional connectors to be created within a customer network to provide additional operational capacity for more efficient migrations.

In this example, a request 128 to migrate four VMs (A, B, C, and D) is received by the server migration service 108C, which selects 302 connector 'A' 118A as an optimal connector to perform operations for the migration via a selection scheme at circle '1'. However, at circle '2', the server migration service 108C determines 304 that connector 'A' 118A has insufficient capacity to perform the migration operations. As one example, the selection 302 and determination 304 could result from a scenario in which only one connector is associated with a VM management server 120A and able to perform migration operations, and the expected (or actual observed) workload may be such that the migration would not be performed quick enough (or could be performed substantially quicker if additional operational capacity existed).

In response, at circle '3', the server migration service 108C can transmit an auto-scale command 306 to the connector 118A indicating that the connector 118A is to cause an additional connector 118B to be instantiated in the customer network 110A. For example, in some embodiments the connector 118A launches the additional connector 118B by issuing a command at circle '4' to its associated VM management server 120A to instruct the VM management server 120A to provision another one or more connectors (e.g., connector 118B), e.g., by cloning the connector 118A or utilizing an existing VM image.

In some embodiments, the server migration service 108C can take into account the characteristics of the VMs to be migrated and cause an additional connector 118B to be launched at a location (e.g., at a particular electronic device/host) that optimizes the performance of some or all of the migration operations. For example, in some embodiments the connector 118A may instruct the instruct the VM management server 120A to provision another connector 118B at a same electronic device that executes one or more of the VMs to be migrated, or to provision a connector at each of multiple other host devices, etc.

The newly-provisioned connector 118B may then, at circles '5A' and '5B', perform similar operations as disclosed with regard to circles '1B' and '1C' from FIG. 1—obtain a server list of VMs under the management of the VM management server 120A at circle '5A', and send the server list as part of configuration data at circle '5B' to the server migration service 108C. The server migration service 108C then, to process the request 128, may identify a group of connectors including connector 118A and connector 118B, and send work assignment messages 130 at circles '6A' and '6B' to connector 118A and connector 118B, respectively, which perform the requested operations for the migration. At the conclusion of the migration, or an amount of time after the conclusion of the migration, the server migration service 108C may optionally send a termination command message 308 to one or both of the connector 118B to cause the connector 118B to terminate itself, or to the connector 118A to terminate the connector 118B (e.g., via issuing a command to the VM management server 120A).

In some embodiments, the server migration service 108C may perform connector auto-scaling on its own—e.g., not in response to any one request 128. For example, the server migration service 108C may determine that existing connectors do not have sufficient current capacity to be able to confidently accommodate any upcoming requests for migration (or to accommodate predicted requests). In some embodiments, the server migration service 108C may monitor the reported connector metrics 206 (e.g., processing utilization, memory utilization, etc.) to determine if one or more meet or exceed a corresponding threshold value, and if so, cause an auto-scaling to be performed. In some embodiments utilizing this technique, migrations can be more rapidly performed due to not having to wait to add additional connectors, as sufficient capacity during times of heavy workloads may potentially always exist.

In some embodiments, the customer can specify auto-scaling rules indicating how and when auto-scaling is to be performed, which can be used by the server migration service to determine if and when to cause an auto-scaling of the connectors within the customer network, and/or which connectors are to be selected as the optimal ones during connector selection. As one example, a customer may specify auto-scaling rules that set upper and/or lower limits for how many connectors are to be instantiated—e.g., a maximum of 50, a minimum of 3, a maximum of one per host, etc. As another example, a customer may specify auto-scaling rules indicating a minimum or maximum aggregate or average metric value desired to be maintained by the set of connectors—e.g., there should always be at least 100 megabits per second of aggregate bandwidth available to the set of connectors, the collective amount of memory utilization of the set of connectors is not to exceed 256 gigabytes, etc. Accordingly, in some embodiments the server migration service can monitor the metric values (reported by the connectors) and/or analyze data in its own database (e.g., known number of connectors and/or placement locations) that corresponds to any customer-provided auto-scaling rules to determine when to perform an auto-scaling (e.g., send an instruction to a connector to cause the connector to instruct the VM management server to add or remove connectors), which connectors are to be selected as optimal during connector selection (e.g., a connector may not be selected if its selection would cause a rule to be violated), etc.

Figure 4:
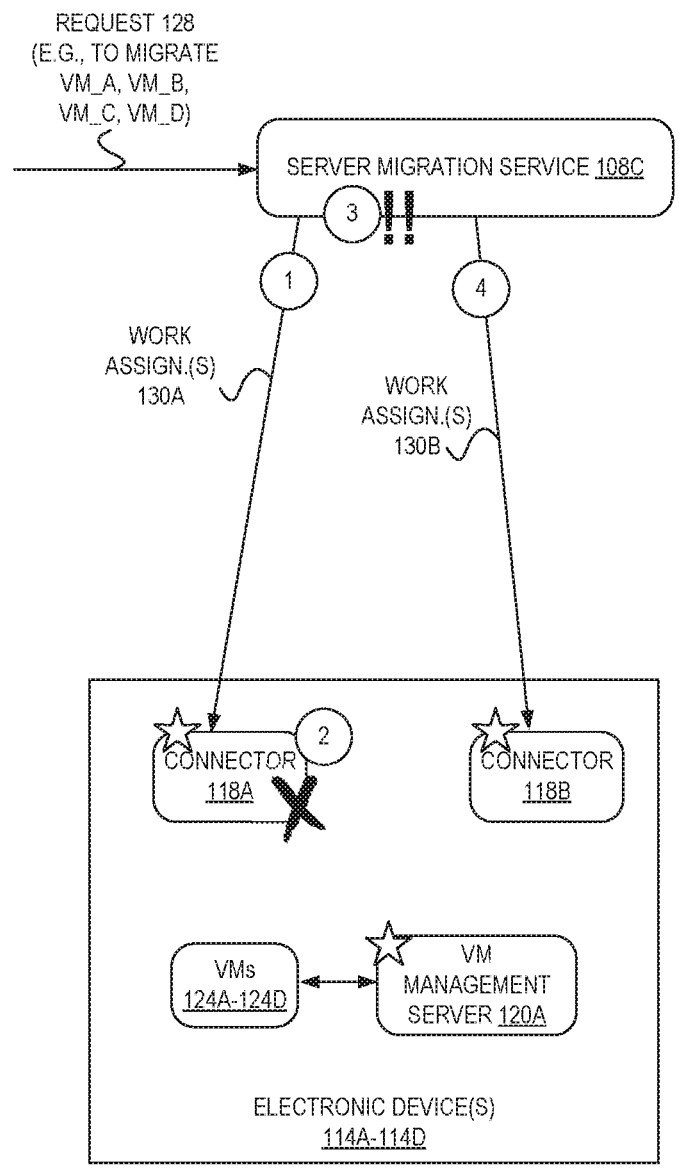
FIG. 4 is a diagram illustrating graceful failover operations for server migration to service provider systems according to some embodiments.

Some embodiments can also improve the performance of server migration via increased resiliency by gracefully accommodating failures or degraded performance on the part of connectors. For example, FIG. 4 is a diagram illustrating graceful failover operations for server migration to service provider systems according to some embodiments. In this example, the request 128 also indicates that VMs A, B, C, and D (VMs. 124A-124D) are to be migrated, and we assume that connector 'A' 118A is selected to perform operations for the migration. Thus, at circle '1' a work assignment message 130A is sent to the connector 'A' 118A.

However, at some point (at circle '2') before the end of performing the operations, the connector 118A fails (e.g., crashes) or suffers from a significant performance degradation, perhaps due to a software bug, problem with its underlying host device, etc.

At circle '3', the server migration service 108C can detect this failure or degradation. For example, in some embodiments the connectors 118A-118B periodically send messages to the server migration service 108C (e.g., "heartbeat" type messages sent for the purpose of indicating the continued presence of a connector, messages seeking work assignments, messages responding to requests sent by the server migration service 108C) that can be monitored by the server migration service 108C. Thus, the server migration service 108C can detect a scenario in which a connector that should be sending back messages is not, and upon a configured number of messages not arriving (or arriving late), the server migration service 108C can determine that the connector is experiencing difficulties or may have crashed.

As another example, in some embodiments the server migration service 108C can determine that a connector has failed or is suffering from degraded performance by monitoring reported connector metric values 206. As one example, the server migration service 108C can determine that a problem exists when certain anomalous metric values are reported a particular number of times—e.g., a processing utilization is greater than or equal to 99% for three consecutive metric reports, or processing utilization and also memory utilization is greater than or equal to 99% for two consecutive metric reports, etc.

When such a performance degradation or failure is detected, the server migration service 108C can select another connector to gracefully "take over" for the failing connector 118A and transmit, at circle '4', a work assignment message (including some or all of the operations of work assignment 130A, perhaps omitting any operations that the server migration service 108C can verify as being completed by connector 118A) to the connector 118B, which can seamlessly continue the migration.

Figure 5:
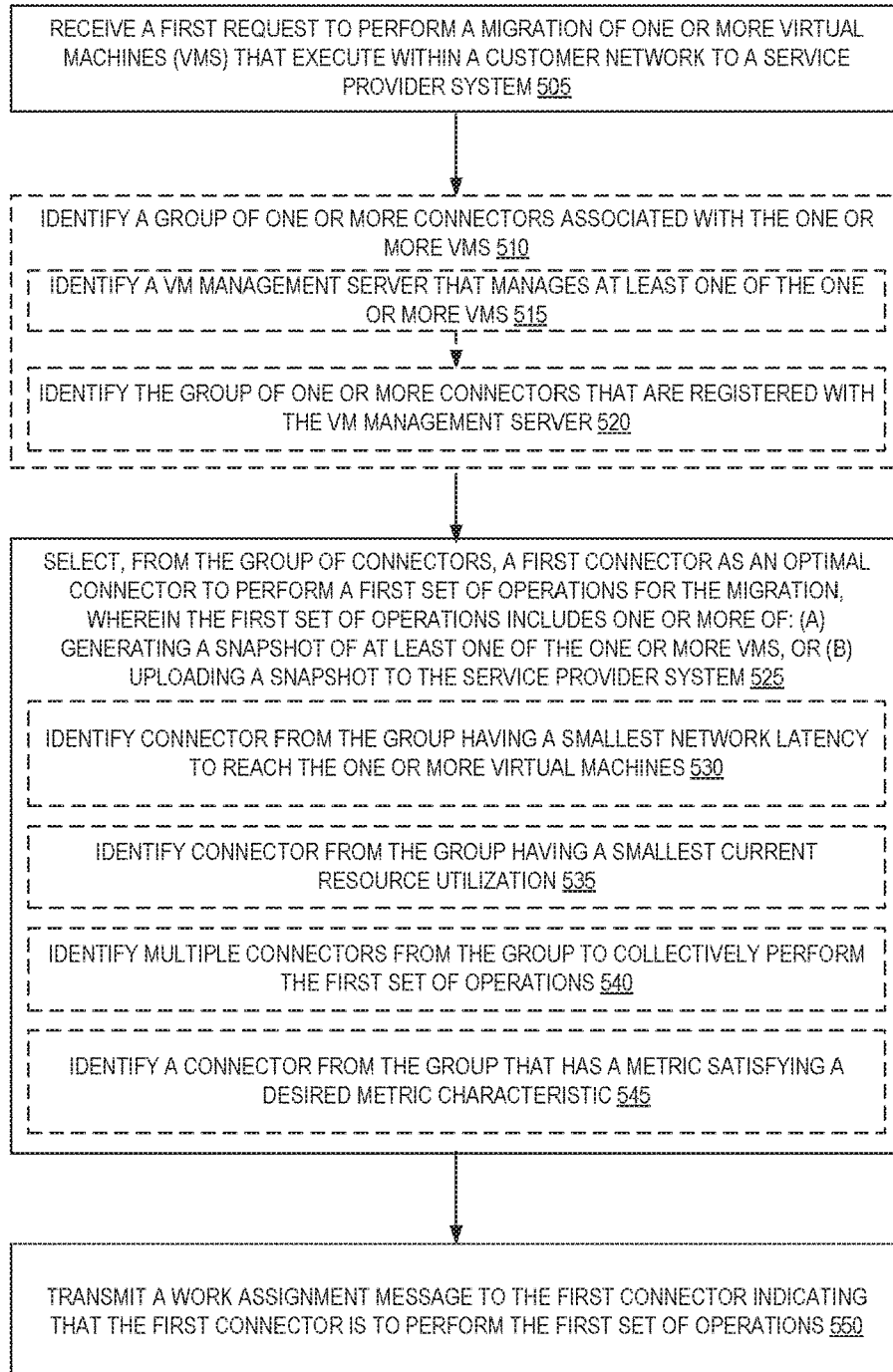
FIG. 5 is a flow diagram illustrating operations for self-organizing server migration to service provider systems according to some embodiments.

FIG. 5 is a flow diagram illustrating operations 500 for self-organizing server migration to service provider systems according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the server migration service 108C of the other figures.

In some embodiments, the operations 500 include (non-illustrated) receiving, from each of one or more connectors, one or more configuration data messages including data comprising an identifier of a VM manager server and one or more identifiers of one or more VMs that are managed by that VM management server. The data may be inserted into one or more data structures that queried or searched—e.g., a VM identifier can be used to index a data structure to identify its associated VM manager server, a VM manager server can be used to index a data structure to identify its associated connector(s), etc. A connector, in some embodiments, is a software application (e.g., a special-purpose VM, a standalone application) that can communicate with a server migration service and one or more VM management servers, allowing the server migration service to indirectly operate upon the VMs managed by a VM management server to perform a migration-related operations (e.g., creating a snapshot of a VM, uploading a snapshot, instantiating another VM) by instructing the connector(s) to issue commands to the one or more VM management servers.

The operations 500 include, at block 505, receiving a first request to perform a migration of one or more VMs that execute within a customer network to a service provider system. The first request may be an HTTP request, and may be received at an API endpoint of the service provider system. The first request, in some embodiments, includes identifiers of the one or more VMs. The customer network may include one or more electronic devices located at one or more data centers that implement a one or more VMs.

The operations 500 optionally include, at block 510, identifying a group of one or more connectors associated with the one or more VMs.

Block 510 may include identifying a VM management server that manages at least one of the one or more VMs at block 515, and identifying the group of one or more connectors that are associated with the VM management server at block 520. In some embodiments, block 510 includes performing a lookup in a data structure using an identifier of a VM to identify a VM management server, and performing a lookup in a data structure using an identifier of the VM management server to identify the one or more connectors, though other data structure organizations and utilized lookups may differ (e.g., only one lookup may be needed).

The operations 500 include, at block 525, selecting, from the group of connectors, a first connector as the optimal connector to perform a first set of operations for the migration, wherein the first set of operations includes one or more of: (a) generating a snapshot of at least one of the one or more VMs, or (b) uploading a snapshot to the service provider system.

In some embodiments, the first connector executes within a same data center as the one or more VMs, and a second connector of the group of connectors executes within a different data center as the one or more VMs.

In some embodiments, the operations 500 also include receiving, from each connector of the group of connectors, a first metric value indicating a current performance characteristic of the connector or a resource availability of the connector, where the selecting of the first connector from the group of connectors (in block 525) is based at least in part on the first metric values, and may be based on identifying an optimal (e.g., a maximum or minimum) of the first metric values.

The first metric value received from each connector of the group of connectors, in some embodiments, comprises one of a processing utilization of the connector; a latency between the connector and at least one of the one or more VMs; an amount of memory available to or utilized by the connector; an amount of non-volatile storage available to or utilized by the connector; or an amount of bandwidth available to or utilized by the connector.

Block 525 optionally includes, for example, identifying a connector from group that has a smallest network latency to reach the one or more virtual machines at block 530. Block 525 can optionally include, for example, identifying a connector from the group having a smallest current resource utilization 535. Block 525 can optionally include, for example, identifying multiple connectors from the group to collectively perform the first set of operations at block 540. Block 525 optionally includes, for example, identifying a connector from the group that has a metric value satisfying a desired metric characteristic at block 545.

Additionally, the operations 500 include, at block 550, transmitting a work assignment message to the first connector indicating that the first connector is to perform the first set of operations.

In some embodiments, the operations 500 also include transmitting a scaling command to the first connector indicating that the first connector is to cause a second connector to be executed within the customer network. In some embodiments, the transmitting of the scaling command occurs responsive to a determination of an anticipated need for additional resources to perform the migration. In some embodiments, the operations 500 also include transmitting a second work assignment message to the second connector indicating that the second connector is to perform a second set of operations for the migration. In some embodiments, the operations 500 also include (e.g., after a completion of the migration) transmitting a termination command to the first connector or the second connector indicating that the second connector is to be terminated. In some embodiments where the termination command is sent to the first connector, the first connector may send a command to its associated VM management server requesting that the second connector be terminated. In some embodiments where the command is sent to the second connector, the second connector may send a command to its associated VM management server requesting that it (i.e., the second connector) be terminated, or may terminate itself in another manner (e.g., may shut itself down).

In some embodiments, the operations 500 also include determining that the first connector has failed or has a performance degradation; and transmitting a second work assignment message to a second connector of the group of connectors indicating that the second connector is to perform a second set of operations for the migration, the second set of operations including one or more of the first set of operations.

Alternatively or additionally, in some embodiments, the operations 500 may include determining that the second connector is now the optimal connector to perform migration operations instead of the first connector, and transmitting a second work assignment message to a second connector of the group of connectors indicating that the second connector is to perform a second set of operations for the migration, the second set of operations including one or more of the first set of operations.

Figure 6:
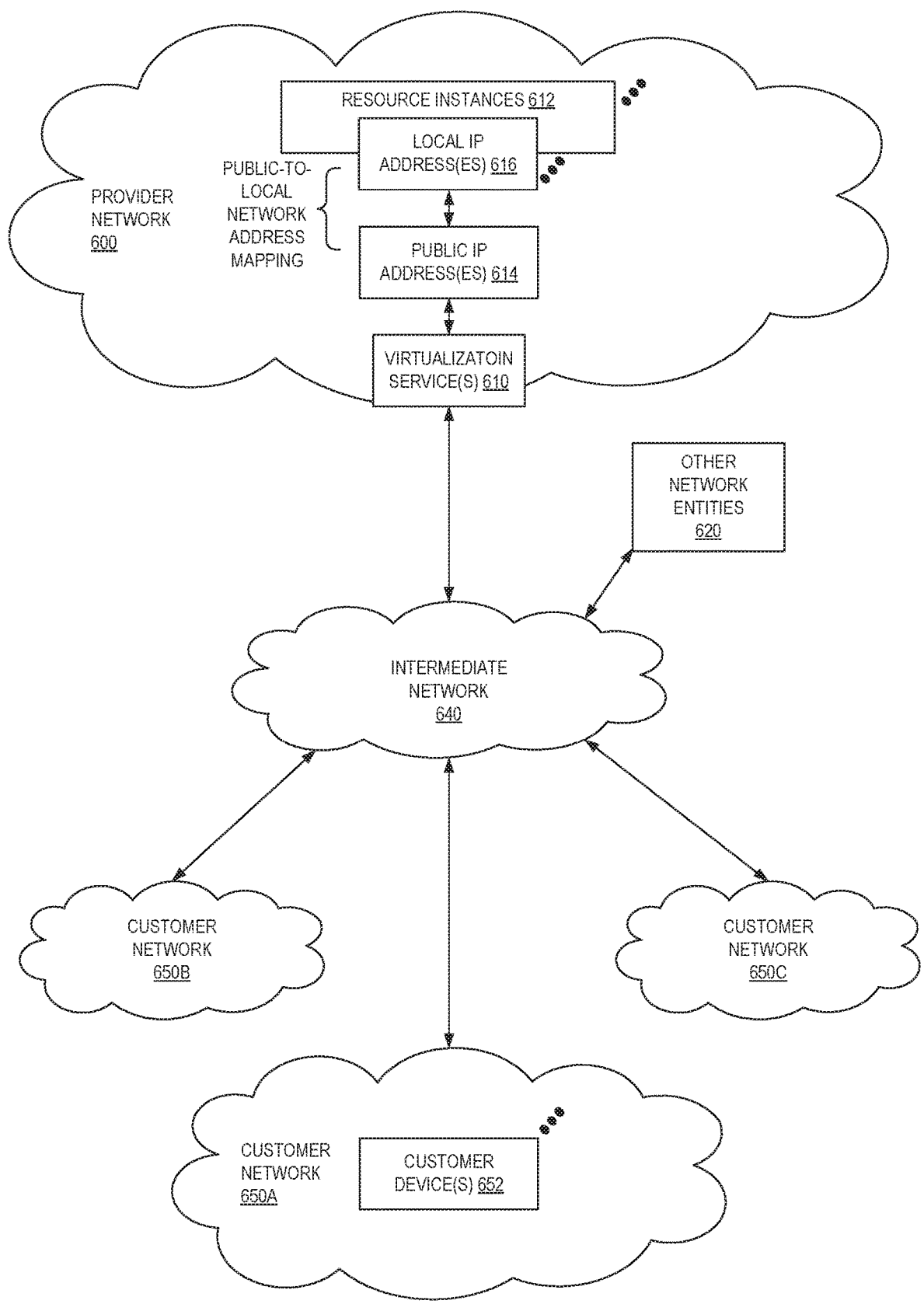
FIG. 6 illustrates an example service provider network environment according to some embodiments.

FIG. 6 illustrates an example provider network (e.g., part of a "service provider system") environment, according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local IP addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates client network 650A) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network 650A may, for example, implement customer-specific applications and present the customer's applications on an intermediate network 640, such as the Internet. Other network entities 620 on the intermediate network 640 may then generate traffic to a destination public IP address 614 published by the customer network 650A; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal network addresses of resource instances in a provider network. Local IP addresses are only mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 network address translation (NAT), and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
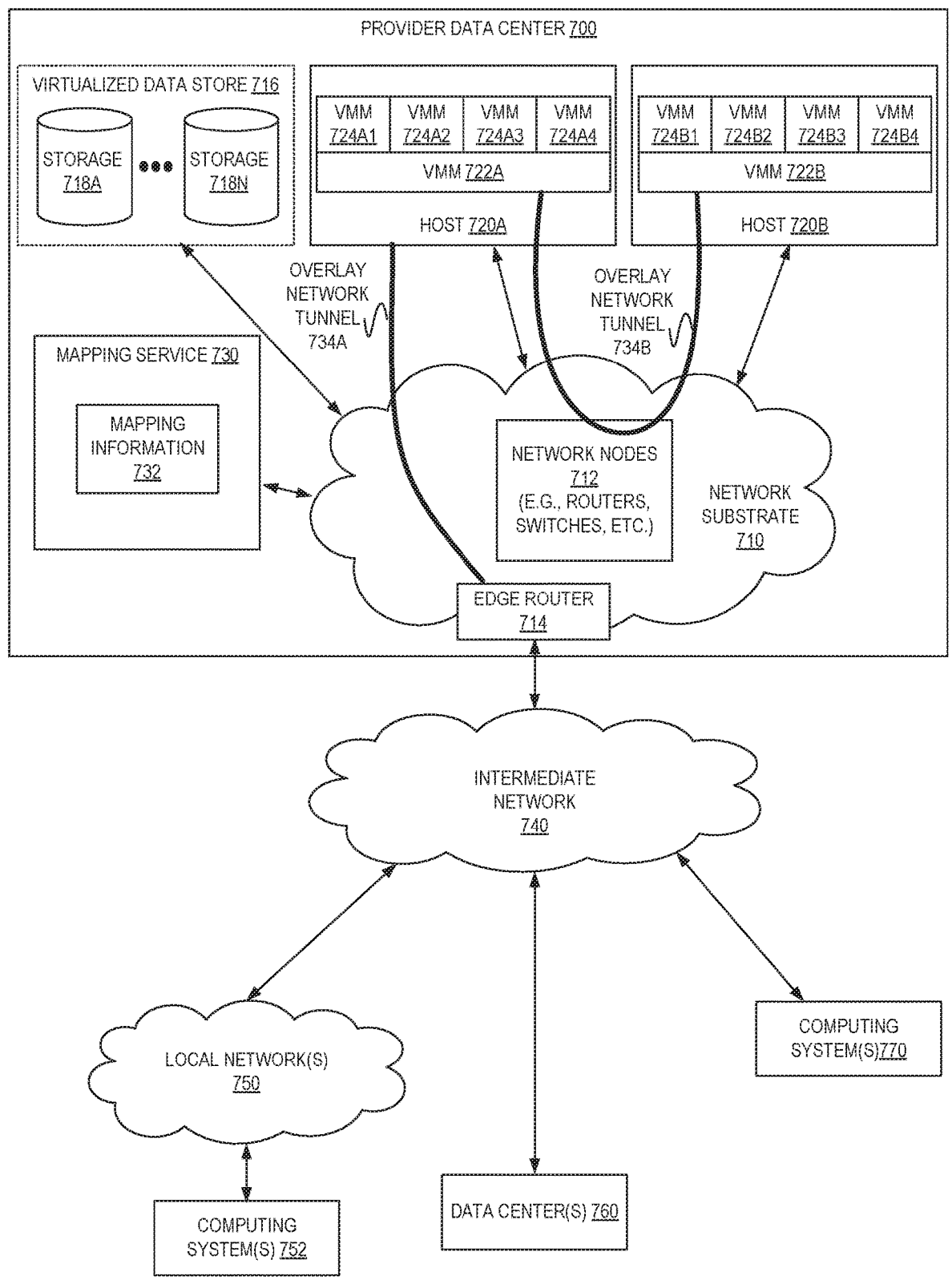
FIG. 7 illustrates an example data center that implements an overlay network on a network substrate using IP tunneling technology according to some embodiments.

FIG. 7 illustrates an example data center that implements an overlay network on a network substrate using IP tunneling technology, according to some embodiments. A provider data center 700 may include a network substrate that includes networking devices 712 such as routers, switches, network address translators (NATs), and so on. Some embodiments may employ an Internet Protocol (IP) tunneling technology to provide an overlay network via which encapsulated packets may be passed through network substrate 710 using tunnels. The IP tunneling technology may provide a mapping and encapsulating system for creating an overlay network on a network (e.g., a local network in data center 700 of FIG. 7) and may provide a separate namespace for the overlay layer (the public IP addresses) and the network substrate 710 layer (the local IP addresses). Packets in the overlay layer may be checked against a mapping directory (e.g., provided by mapping service 730) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 730) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 7, an example overlay network tunnel 734A from a virtual machine (VM) 724A on host 720A to a device on the intermediate network 750 and an example overlay network tunnel 734B between a VM 724B on host 720B and a VM 724C on host 720C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 7, at least some networks in which embodiments may be implemented may include hardware virtualization technology that enables multiple operating systems to run concurrently on a host computer (e.g., hosts 720A and 720B of FIG. 7), i.e. as virtual machines (VMs) 724 on the hosts 720. The VMs 724 may, for example, be executed in slots on the hosts 720 that are rented or leased to customers of a network provider. A hypervisor, or virtual machine monitor (VMM) 722, on a host 720 presents the VMs 724 on the host with a virtual platform and monitors the execution of the VMs 724. Each VM 724 may be provided with one or more local IP addresses; the VMM 722 on a host 720 may be aware of the local IP addresses of the VMs 724 on the host. A mapping service 730 may be aware of all network IP prefixes and the IP addresses of routers or other devices serving IP addresses on the local network. This includes the IP addresses of the VMMs 722 serving multiple VMs 724. The mapping service 730 may be centralized, for example on a server system, or alternatively may be distributed among two or more server systems or other devices on the network. A network may, for example, use the mapping service technology and IP tunneling technology to, for example, route data packets between VMs 724 on different hosts 720 within the data center 700 network; note that an interior gateway protocol (IGP) may be used to exchange routing information within such a local network.

In addition, a network such as the provider data center 700 network (which is sometimes referred to as an autonomous system (AS)) may use the mapping service technology, IP tunneling technology, and routing service technology to route packets from the VMs 724 to Internet destinations, and from Internet sources to the VMs 724. Note that an external gateway protocol (EGP) or border gateway protocol (BGP) is typically used for Internet routing between sources and destinations on the Internet. FIG. 7 shows an example provider data center 700 implementing a network that provides resource virtualization technology and that provides full Internet access via edge router(s) 714 that connect to Internet transit providers, according to some embodiments. The provider data center 700 may, for example, provide customers the ability to implement virtual computing systems (VMs 724) via a hardware virtualization service and the ability to implement virtualized data stores 716 on storage resources 718 via a storage virtualization service.

The data center 700 network may implement IP tunneling technology, mapping service technology, and a routing service technology to route traffic to and from virtualized resources, for example to route packets from the VMs 724 on hosts 720 in data center 700 to Internet destinations, and from Internet sources to the VMs 724. Internet sources and destinations may, for example, include computing systems 770 connected to the intermediate network 740 and computing systems 752 connected to local networks 750 that connect to the intermediate network 740 (e.g., via edge router(s) 714 that connect the network 750 to Internet transit providers). The provider data center 700 network may also route packets between resources in data center 700, for example from a VM 724 on a host 720 in data center 700 to other VMs 724 on the same host or on other hosts 720 in data center 700.

A service provider that provides data center 700 may also provide additional data center(s) 760 that include hardware virtualization technology similar to data center 700 and that may also be connected to intermediate network 740. Packets may be forwarded from data center 700 to other data centers 760, for example from a VM 724 on a host 720 in data center 700 to another VM on another host in another, similar data center 760, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 718, as virtualized resources to customers of a network provider in a similar manner.

Figure 8:
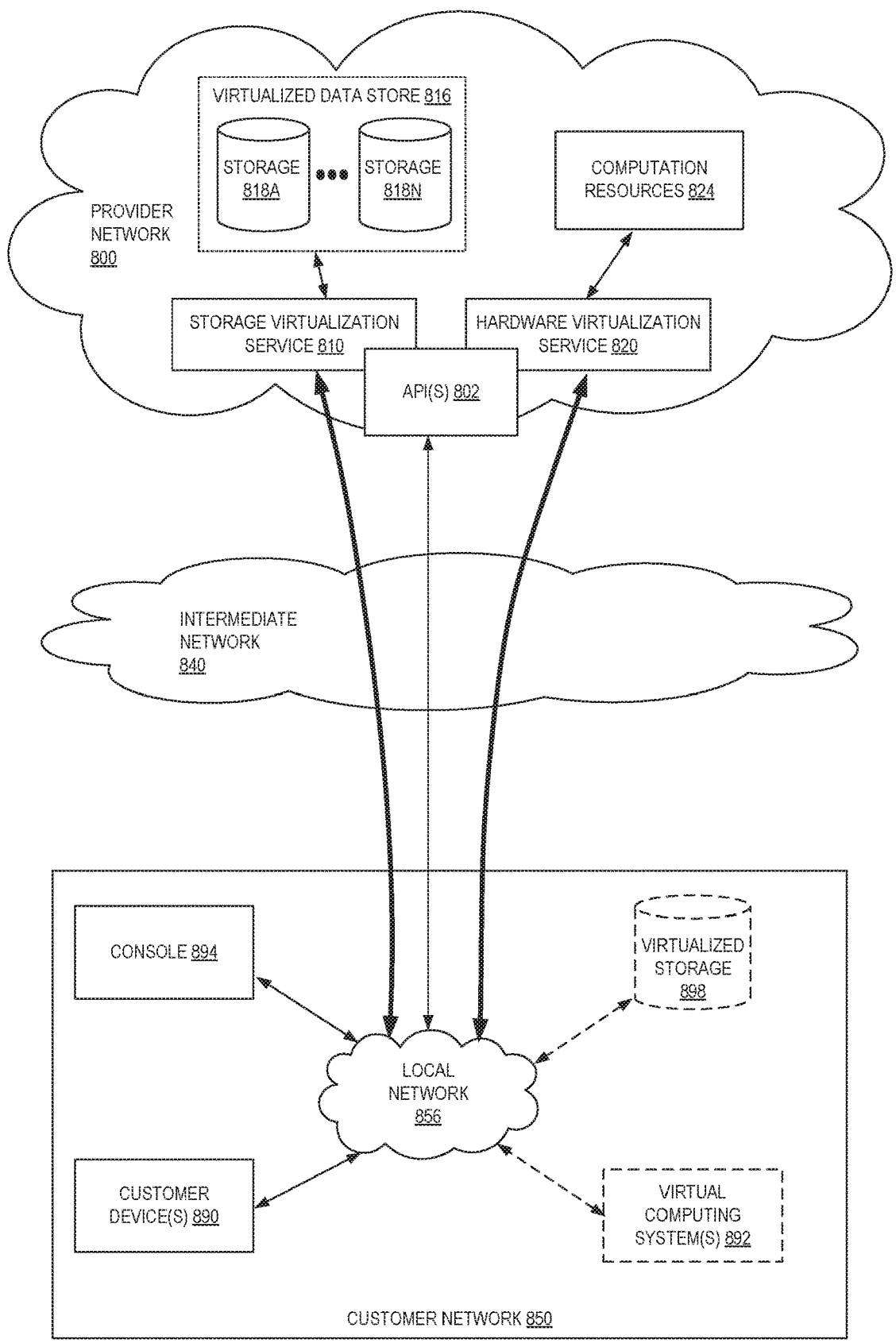
FIG. 8 is a block diagram of an example service provider network that provides a storage virtualization service and a hardware virtualization service to customers according to some embodiments.
Figure 9:
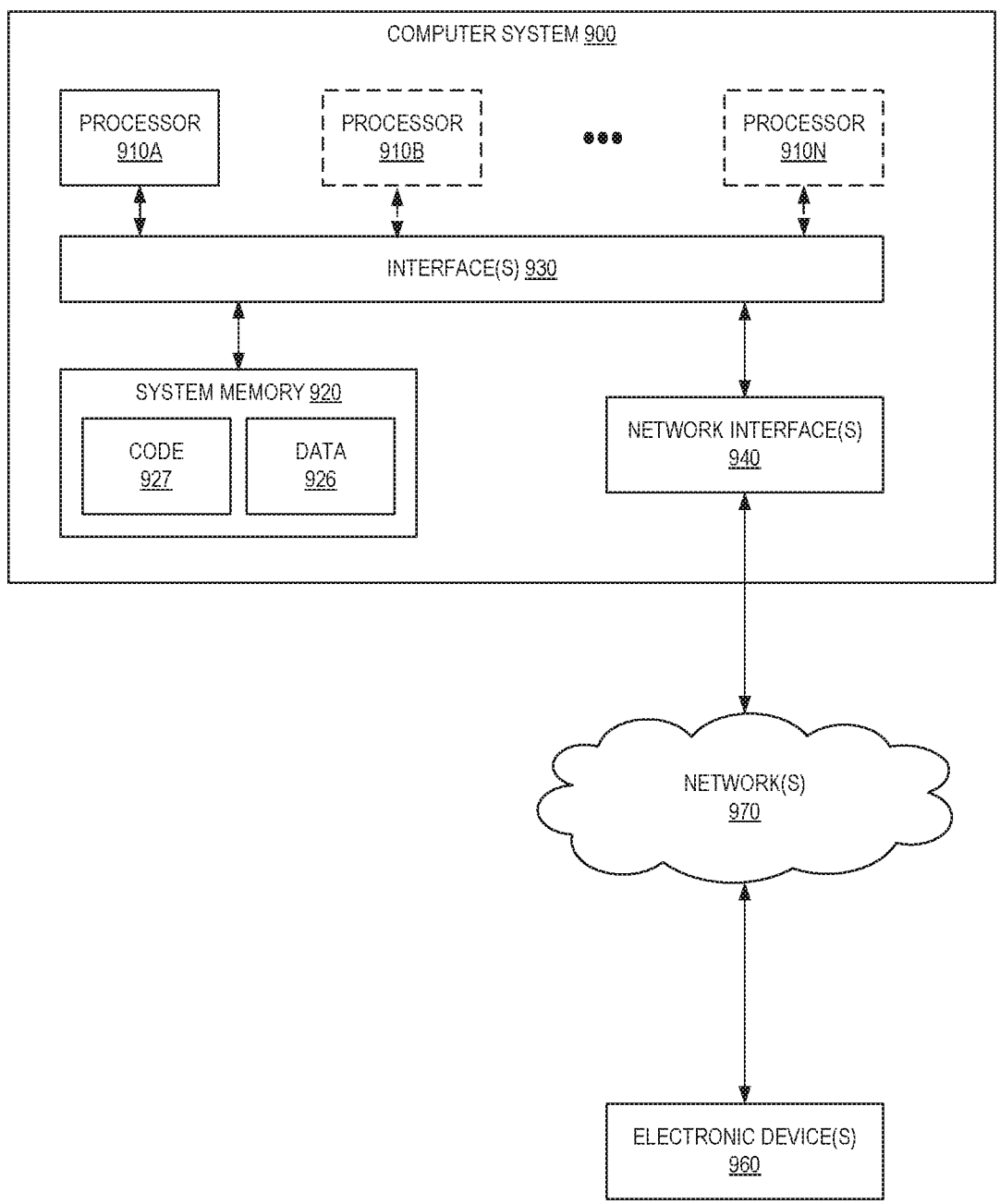
FIG. 9 is a block diagram illustrating an example computer system that may be used in some embodiments.

FIG. 8 is a block diagram of an example provider network that provides a storage virtualization service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894. In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 or console 894, the customer may access the functionality of storage virtualization service 810, for example via one or more APIs 802, to access data from and store data to a virtual data store 816 provided by the provider network 800. In some embodiments, a virtualized data store gateway (not shown) may be provided at the customer network 850 that may locally cache at least some data, for example frequently accessed or critical data, and that may communicate with virtualized data store service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes, which appear to the user as local virtualized storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

In some embodiments, a system that implements a portion or all of the techniques for self-organizing server migration to service provider system environments as described herein may include a general-purpose computer system that includes or is configured to access one or more computer-accessible media, such as computer system 900 illustrated in FIG. 10. In the illustrated embodiment, computer system 900 includes one or more processors 910 coupled to a system memory 920 via an input/output (I/O) interface 930. Computer system 900 further includes a network interface 940 coupled to I/O interface 930. While FIG. 10 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via I/O any other suitable type of network and/or protocol.

In some embodiments, system memory 920 may be one embodiment of a computer-accessible medium configured to store program instructions and data for implementing a server migration service in a provider network environment. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending, or storing instructions and/or data implemented in accordance with the foregoing description upon a computer-accessible medium. A computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 108A-108Z, 124A-124F) may be used to indicate that there can be one or multiple instances of the referenced entity in some embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The various methods as illustrated in the figures and described herein represent exemplary embodiments of methods. The methods may be implemented in software, hardware, or a combination thereof. The order of the methods may be changed, and various elements may be added, reordered, combined, omitted, modified, etc. Thus, various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method comprising:
   receiving, from a first connector that executes within a customer network, a plurality of identifiers of a plurality of virtual machines (VMs) that are managed by a VM management server within the customer network, wherein the first connector is associated with the VM management server to perform operations involving the plurality of VMs;
   receiving one or more metric values from each of a plurality of connectors in the customer network, the plurality of connectors including the first connector, wherein each of the one or more metric values indicates a current performance characteristic of the connector or a resource availability of the connector, wherein each of the one or more metric values comprises:
      a processing utilization of the corresponding connector;
      a latency between the corresponding connector and at least one of the one or more VMs;
      an amount of memory available to or utilized by the corresponding connector;
      an amount of non-volatile storage available to or utilized by the corresponding connector; or
      an amount of bandwidth available to or utilized by the corresponding connector;
   receiving a first request to perform a migration of one or more of the plurality of VMs from the customer network to a service provider system;
   selecting, from the plurality of connectors, the first connector as an optimal connector to perform a first set of operations for the migration, the selecting including identifying an optimal metric value within a group of metric values corresponding to the plurality of connectors based at least on a type of the first set of operations, wherein the first set of operations includes one or more of:
      generating a snapshot of at least one of the one or more VMs, or
      uploading the snapshot to the service provider system;
   transmitting a work assignment message to the first connector indicating that the first connector is to perform the first set of operations;
   upon transmitting the work assignment message to the first connector, determining that a second connector of the plurality of connectors is the optimal connector for the migration; and
   transmitting a second work assignment message to the second connector indicating that the second connector is to perform a second set of operations for the migration, the second set of operations including one or more of the first set of operations.

2. The computer-implemented method of claim 1, further comprising:
   transmitting a scaling command to the first connector indicating that the first connector is to cause a third connector to be executed within the customer network; and
   transmitting a third work assignment message to the third connector indicating that the third connector is to perform a third set of operations for the migration.

3. The computer-implemented method of claim 1, wherein determining that the second connector of the pluralityf of connectors is the optimal connector for the migration comprises determining that the first connector has failed or has a performance degradation.

4. A computer-implemented method comprising:
receiving a first request to perform a migration of one or more virtual machines (VMs) of a plurality of VMs that execute within a customer network to a service provider system;
receiving, from each connector of a plurality of connectors executing within the customer network that are associated with one or more VM management servers each managing ones of the plurality of VMs, one or more metric values, wherein each of the one or more metric values is one of:
a processing utilization of the corresponding connector,
a latency between the corresponding connector and at least one of the one or more VMs,
an amount of memory available to or utilized by the corresponding connector,
an amount of non-volatile storage available to or utilized by the corresponding connector, or
an amount of bandwidth available to or utilized by the corresponding connector;
selecting, from the plurality of connectors based at least in part on ones of the metric values, a first connector as an optimal connector to perform a first set of operations for the migration, wherein the first set of operations includes one or more of:
generating a snapshot of at least one of the one or more VMs, or
uploading a snapshot to the service provider system;
transmitting a work assignment message to the first connector indicating that the first connector is to perform the first set of operations;
upon transmitting the work assignment message to the first connector, determining that a second connector of the plurality of connectors is the optimal connector for the migration; and
transmitting a second work assignment message to the second connector indicating that the second connector is to perform a second set of operations for the migration, the second set of operations including one or more of the first set of operations.

5. The computer-implemented method of claim 4, wherein the first connector executes within a same data center as the one or more VMs, and wherein the second connector of the plurality of connectors executes within a different data center as the one or more VMs.

6. The computer-implemented method of claim 4, further comprising:
transmitting a scaling command to the first connector indicating that the first connector is to cause a third connector to be executed within the customer network.

7. The computer-implemented method of claim 6, wherein the transmitting of the scaling command occurs responsive to a determination of an anticipated need for additional resources to perform the migration.

8. The computer-implemented method of claim 6, further comprising:
transmitting a third work assignment message to the third connector indicating that the third connector is to perform a third set of operations for the migration.

9. The computer-implemented method of claim 8, further comprising:
transmitting a termination command to the first connector or the third connector indicating that the third connector is to be terminated.

10. The computer-implemented method of claim 4, further comprising:
receiving, from the first connector, one or more configuration data messages including an identifier of a VM manager server that the first connector is associated with and one or more identifiers of those of the plurality of VMs that are managed by the VM management server.

11. A system comprising:
a first one or more electronic devices within a customer network that implement a plurality of connectors, the plurality of connectors being associated with one or more virtual machine (VM) management servers to perform operations involving a plurality of VMs that are managed by the one or more VM management servers; and
a second one or more electronic devices within a service provider system that implement a server migration service, the server migration service comprising instructions which, when executed by one or more processors of the second one or more electronic devices, cause the server migration service to:
receive a first request to perform a migration of one or more of the plurality of VMs from the customer network to the service provider system;
receive, from each of the plurality of connectors, one or more metric values,
wherein each of the one or more metric values is one of:
a processing utilization of the corresponding connector,
a latency between the corresponding connector and at least one of the one or more VMs,
an amount of memory available to or utilized by the corresponding connector,
an amount of non-volatile storage available to or utilized by the corresponding connector, or
an amount of bandwidth available to or utilized by the corresponding connector;
select, from between the plurality of connectors based on ones of the metric values, a first connector as an optimal connector to perform a first set of operations for the migration, wherein the first set of operations includes one or more of:
generating a snapshot of at least one of the one or more VMs, or
uploading a snapshot to the service provider system;
transmit a work assignment message to the first connector indicating that the first connector is to perform the first set of operations;
upon transmitting the work assignment message to the first connector, determine that a second connector of the plurality of connectors is the optimal connector for the migration; and transmit a second work assignment message to the second connector indicating that the second connector is to perform a second set of operations for the migration, the second set of operations including one or more of the first set of operations.

12. The system of claim 11, wherein the first connector executes within a same data center as the one or more VMs, and wherein the second connector of the plurality of connectors executes within a different data center as the one or more VMs.

13. The system of claim 11, wherein the instructions, when executed by the second one or more electronic devices, further cause the server migration service to:
transmit a scaling command to the first connector indicating that the first connector is to cause a third connector to be executed within the customer network.

14. The system of claim 13, wherein the server migration service is to transmit the scaling command responsive to a determination of an anticipated need for additional resources to perform the migration.

15. The system of claim 13, wherein the instructions, when executed by the second one or more electronic devices, further cause the server migration service to:
transmit a third work assignment message to the third connector indicating that the third connector is to perform a third set of operations for the migration.

16. The computer-implemented method of claim 4, wherein the receiving of the first request, the receiving of the metric values, the selecting of the first connector as the optimal connector, and the transmitting of the work assignment message are performed by a server migration service implemented by one or more computing devices within the service provider system, wherein the service provider system is multi-tenant and is geographically distinct from the customer network.

17. The computer-implemented method of claim 4, wherein:
each of the plurality of connectors comprises a virtual machine or application that executes within the customer network;
each of the plurality of connectors can perform multiple different types of operations as part of a migration, the multiple different types of operations for a connector including at least two of:
validating a replication job,
creating a full snapshot,
creating an incremental snapshot,
creating a storage location within the service provider system,
uploading a full snapshot to a storage location within the service provider system,
uploading an incremental snapshot to a storage location within the service provider system,
deleting migration artifacts, or
consolidating a snapshot.

18. The computer-implemented method of claim 4, wherein determining that the second connector of the plurality of connectors is the optimal connector for the migration is based on one of:
a determination that the first connector is no longer the optimal connector for the migration,
one or more events associated with the second connector, or
a re-assignment threshold indicating a number of times one or more of the operations in the first set of operations have been re-assigned.

19. The computer-implemented method of claim 4, further comprising wherein determining that the second connector of the plurality of connectors is the optimal connector for the migration is based on a type of one or more of the operations in the first set of operations, wherein the type of an operation indicates whether the operation can be resumed by another connector once performance of the operation has already begun.

20. The computer-implemented method of claim 4, further comprising:
transmitting an abort message to the first connector to cause the first connector to abort performance of the first set of operations.

* * * * *